(12) United States Patent
Omori et al.

(10) Patent No.: US 11,087,934 B2
(45) Date of Patent: Aug. 10, 2021

(54) ARC-QUENCHING DEVICE FOR DIRECT CURRENT SWITCH

(71) Applicant: Omron Corporation, Kyoto (JP)

(72) Inventors: Koji Omori, Okayama (JP); Makito Morii, Okayama (JP); Hiroyuki Otsuka, Okayama (JP)

(73) Assignee: Omron Corporation, Kyoto (JP)

( * ) Notice: Subject to any disclaimer, the term of this patent is extended or adjusted under 35 U.S.C. 154(b) by 229 days.

(21) Appl. No.: 16/347,268

(22) PCT Filed: Oct. 20, 2017

(86) PCT No.: PCT/JP2017/038012
§ 371 (c)(1),
(2) Date: May 3, 2019

(87) PCT Pub. No.: WO2018/131248
PCT Pub. Date: Jul. 19, 2018

(65) Prior Publication Data
US 2019/0279830 A1    Sep. 12, 2019

(30) Foreign Application Priority Data

Jan. 13, 2017    (JP) .............................. JP2017-004385

(51) Int. Cl.
     *H01H 9/54*      (2006.01)
     *H01H 33/59*      (2006.01)
     *H02P 7/06*      (2006.01)

(52) U.S. Cl.
     CPC .............. *H01H 9/542* (2013.01); *H01H 9/54* (2013.01); *H01H 33/59* (2013.01); *H02P 7/06* (2013.01)

(58) Field of Classification Search
CPC .......... H01H 9/542; H01H 9/54; H01H 33/59; H01H 9/30; H01H 2009/544
See application file for complete search history.

(56) References Cited

U.S. PATENT DOCUMENTS 7,928,685 B2 *   4/2011   Dornauer ............... H01H 9/542
                                                                  318/778

FOREIGN PATENT DOCUMENTS

CN          105185623 A      12/2015
EP            3259816 B1      4/2019
JP          S61-259416 A      11/1986
(Continued)

OTHER PUBLICATIONS

Office Action issued in Korean Application No. 10-2019-7012356; dated May 21, 2020 (8 pages).
(Continued)

*Primary Examiner* — Adolf D Berhane
*Assistant Examiner* — Afework S Demisse
(74) *Attorney, Agent, or Firm* — Osha Bergman Watanabe & Burton LLP (57) ABSTRACT

An arc quenching device, which is highly reliable, small-sized, and inexpensive, includes: a semiconductor switch connected in parallel to a first switch which is mechanical; a constant voltage circuit configured to use a voltage which is generated between both contact points of the first switch to output a voltage which causes the semiconductor switch to turn on; and a second timer circuit configured to cause the semiconductor switch to turn off after a predetermined time has elapsed since the semiconductor switch turned on.

8 Claims, 6 Drawing Sheets (56) References Cited

FOREIGN PATENT DOCUMENTS

| JP | H07-62970 B2 | 7/1995 |
| JP | H08-106839 A | 4/1996 |
| JP | 3441813 B2 | 9/2003 |
| JP | 2014079093 A * | 5/2014 |
| KR | 20130109879 A | 10/2013 |
| WO | 2011/034140 A1 | 3/2011 |

OTHER PUBLICATIONS

Office Action issued in the counterpart Chinese Patent Application No. 201780067135.1, dated Jan. 10, 2020 (11 pages).
International Search Report issued in Application No. PCT/JP2017/038012, dated Dec. 5, 2017 (1 page).
Written Opinion issued in International Application No. PCT/JP2017/038012, dated Dec. 5, 2017 (9 pages).
International Preliminary Report on Patentability issued in Application No. PCT/JP2017/038012, dated Feb. 19, 2019 (9 pages).
Office Action issued in the counterpart German Patent Application No. 112017006826.6, dated Dec. 1, 2020 (9 pages).

* cited by examiner

ARC-QUENCHING DEVICE FOR DIRECT CURRENT SWITCH

TECHNICAL FIELD

The present invention relates to a direct current switch arc quenching device configured to quench an arc which occurs between contact points of a direct current switch.

BACKGROUND ART

An arc quenching device configured to quench an arc which occurs in a direct current switch is conventionally known. As disclosed in, for example, Patent Literature 1, an arc quenching device is connected in parallel to a direct current switch and configured to quench an arc which occurs between contact points of the direct current switch.

The arc quenching device disclosed in Patent Literature 1 specifically includes a direct current power supply, a mechanical switch, a semiconductor switch, a power supply circuit, a control circuit, and a timing circuit. The mechanical switch is connected in series to the direct current power supply. The semiconductor switch is connected in parallel to the mechanical switch. The control circuit turns on and off the semiconductor switch. The power supply circuit drives the control circuit. The timing circuit is (i) connected between (a) one of contact points of the mechanical switch and (b) the power supply circuit and (ii) configured to set a time of operation of the power supply circuit. The arc quenching device which is thus configured uses a voltage of an arc which occurs in the mechanical switch to turn on the semiconductor switch so as to quench the arc.

Note that the arc which occurs in the mechanical switch both in a case where the mechanical switch is closed and in a case where the mechanical switch is opened. Note, however, that an arc which occurs in a case where the mechanical switch is closed is small, whereas an arc which occurs in a case where the mechanical switch is opened is so large as to greatly damage the mechanical switch.

CITATION LIST

Patent Literatures

[Patent Literature 1]
Japanese Patent No. 3441813
[Patent Literature 2]
Japanese Examined Patent Application Publication, Tokukohei, No. 7-62970

SUMMARY OF INVENTION

Technical Problem

According to the configuration of Patent Literature 1, the semiconductor switch which is turned on in response to the arc which has occurred in the mechanical switch is turned off by the following process. Specifically, the semiconductor switch is turned off by a process in which the timing circuit stops its operation, the timing circuit which has stopped its operation causes a reduction in output voltage of the power supply circuit, and eventually the control circuit cannot maintain an on state of the semiconductor switch, so that the semiconductor switch is turned off.

This causes a gradual change in state of the semiconductor switch from a conductive state in which the semiconductor switch has a sufficiently low impedance to a non-conductive state in which the semiconductor switch has an extremely high impedance. This prolongs a transition period for a change in state of the semiconductor switch from the on state to the off state, so that the semiconductor switch loses more electric power and generates a larger amount of heat. This causes the semiconductor switch to increase in electric power loss to a level which exceeds a limit of an allowable loss, so that a trouble may occur in the semiconductor switch.

In view of the above, the semiconductor switch needs to be an expensive element which has a sufficient tolerance for an electric power loss. Further, in order for the semiconductor switch to interrupt a larger electric current, the arc quenching device needs to have a heat radiation structure which restrains an increase in temperature of the semiconductor switch. The arc quenching device which has the heat radiation structure has a complicated structure. This hinders miniaturization of the arc quenching device.

In view of the above, an aspect of the present invention has an object to provide a highly reliable, small-sized, and inexpensive arc quenching device configured to quench an arc which occurs in a direct current switch.

Solution to Problem

An arc quenching device in accordance with an aspect of the present invention includes: a semiconductor switch connected in parallel to a first switch which is mechanical and is connected in series to a direct current power supply of a load device; a power supply circuit connected to each of both contact points of the first switch and configured to use a voltage which is generated between the both contact points in response to opening of the first switch to output a voltage which causes the semiconductor switch to turn on; and a timer circuit provided between the power supply circuit and the semiconductor switch and configured to (i) operate in response to an output voltage of the power supply circuit and (ii) after a predetermined time has elapsed since the semiconductor switch turned on, interrupt supply of a voltage from the power supply circuit to the semiconductor switch so as to cause the semiconductor switch to turn off.

Advantageous Effects of Invention

According to an aspect of the present invention, an semiconductor switch can switch its state from an on state to an off state by an operation of a timer circuit without having a transition period for a change from the on state to the off state. With the configuration, the semiconductor switch loses less electric power and generates a smaller amount of heat. This causes no fear that a trouble may occur in the semiconductor switch due to a greater electric power loss. Thus, the semiconductor switch does not need to (i) be an expensive and large-sized element and (ii) be provided with a heat radiation device. This makes it possible to configure an arc quenching device which is highly reliable, small-sized, and inexpensive.

DESCRIPTION OF EMBODIMENTS

Embodiment 1

Figure 1:
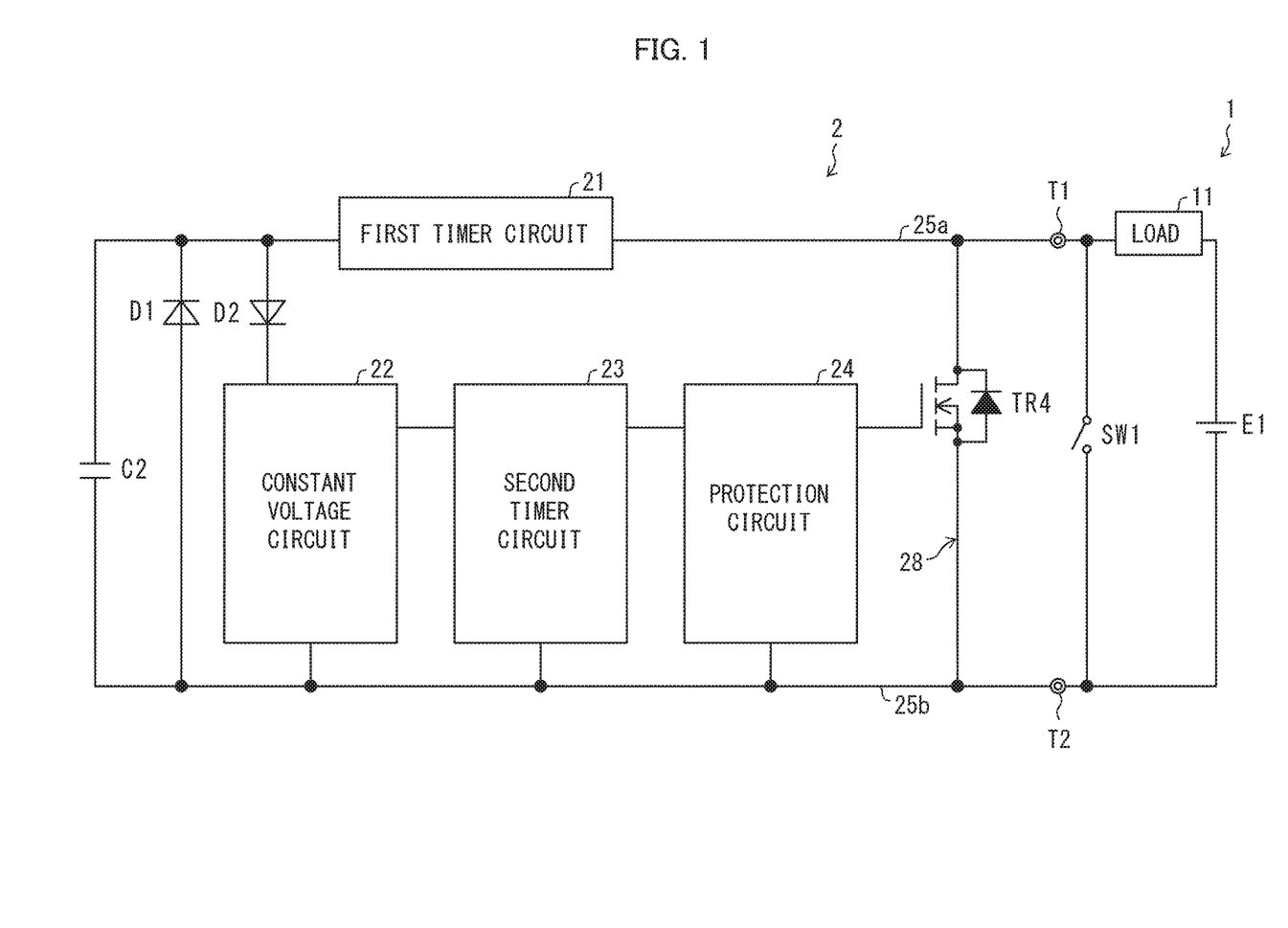
FIG. 1 is a block diagram illustrating a state in which an arc quenching device of an embodiment of the present invention is connected to a load device.

An embodiment of the present invention is described below with reference to the drawings. The description of Embodiment 1 takes, as an example, a case where a load device is a portable electric power tool and an arc quenching device is incorporated in the load device. FIG. 1 is a block diagram illustrating a state in which an arc quenching device of Embodiment 1 of the present invention is connected to a load device.

(Configuration of Load Device 1)

As illustrated in FIG. 1, the load device 1 includes a direct current power supply E1, a load 11, and a first switch (direct current switch) SW1 which are connected in series so as to configure a closed loop. The direct current power supply E1 is, for example, a storage battery. The load 11 is, for example, a motor. The first switch SW1 is a mechanical contact switch which has contact points.

(Configuration of Arc Quenching Device 2)

The arc quenching device 2 includes a semiconductor switch TR4, a first timer circuit (interruption circuit) 21, a constant voltage circuit 22, a second timer circuit (timer circuit) 23, and a protection circuit 24.

According to Embodiment 1, the semiconductor switch TR4 is a field effect transistor (FET) and has (i) a drain which is connected to a first electrically conducted path 25a located on a positive side and (ii) a source which is connected to a second electrically conducted path 25b located on a negative side. The first electrically conducted path 25a is connected to a positive side connection terminal T1, and the positive side connection terminal T1 is connected to one of terminals of the first switch SW1. The second electrically conducted path 25b is connected to a negative side connection terminal T2, and the negative side connection terminal T2 is connected to the other of the terminals of the first switch SW1. A circuit which leads from the positive side connection terminal T1 through the semiconductor switch TR4 to the negative side connection terminal T2 is a bypass circuit 28 with respect to the first switch SW1, and the semiconductor switch TR4 is connected in parallel to the first switch SW1.

The constant voltage circuit 22 is connected to each of the first electrically conducted path 25a and the second electrically conducted path 25b. The constant voltage circuit 22 and the first electrically conducted path 25a are connected via a diode D2 in which a direction in which an electric current flows from the first electrically conducted path 25a to the constant voltage circuit 22 is a forward direction. The constant voltage circuit 22 is a power supply circuit which is supplied with electric power from each of the first electrically conducted path 25a and the second electrically conducted path 25b and supplies a fixed voltage to the semiconductor switch TR4.

The first timer circuit 21 is provided, on the first electrically conducted path 25a, between (a) a connection between the first electrically conducted path 25a and the semiconductor switch TR4 and (b) a connection between the first electrically conducted path 25a and the diode D2. The first timer circuit 21 interrupts the first electrically conducted path 25a after a given time has elapsed since the arc quenching device 2 started its operation, i.e., after charging of a capacitor C1 has been finished (after the capacitor C1 is full of electric charges).

The second timer circuit 23 and the protection circuit 24 are provided between the constant voltage circuit 22 and the semiconductor switch TR4. The second timer circuit 23 is provided so as to be immediately following the constant voltage circuit 22, and the protection circuit 24 is provided so as to be following the second timer circuit 23.

The second timer circuit 23 stops its operation after a given time has elapsed since the second timer circuit 23 started the operation. This interrupts electric conduction from the constant voltage circuit 22 to the semiconductor switch TR4.

The protection circuit 24 supplies, to a gate of the semiconductor switch TR4, a voltage which is supplied from the constant voltage circuit 22 via the second timer circuit 23. The protection circuit 24 protects the semiconductor switch TR4 so that no voltage that is not less than a maximum rated voltage is applied to the gate of the semiconductor switch TR4. Note that the arc quenching device 2, whose basic operation is to quench an arc, does not necessarily need to include the protection circuit 24.

Furthermore, a diode D1 and a capacitor C2 are provided between the first electrically conducted path 25a and the second electrically conducted path 25b so as to be located on a first side of the constant voltage circuit 22 which first side is opposite from a second side of the constant voltage circuit 22 on which second side the semiconductor switch TR4 is provided. The diode D1 in which a direction in which an electric current flows from the second electrically conducted path 25b to the first electrically conducted path 25a is a forward direction is connected to each of the first electrically conducted path 25a and the second electrically conducted path 25b. The diode D1 resets the first timer circuit 21 by causing a closed loop which is formed by the first timer circuit 21, the semiconductor switch TR4, and the diode D1 to emit electric charges which have been accumulated in the first timer circuit 21. The capacitor C2 removes noise of each of the first electrically conducted path 25a and the second electrically conducted path 25b so as to stabilize a voltage between the first electrically conducted path 25a and the second electrically conducted path 25b. Note that the arc quenching device 2, whose basic operation is to quench an arc, does not necessarily need to include the capacitor C2.

(Specific Circuit of Arc Quenching Device 2)

Figure 2:
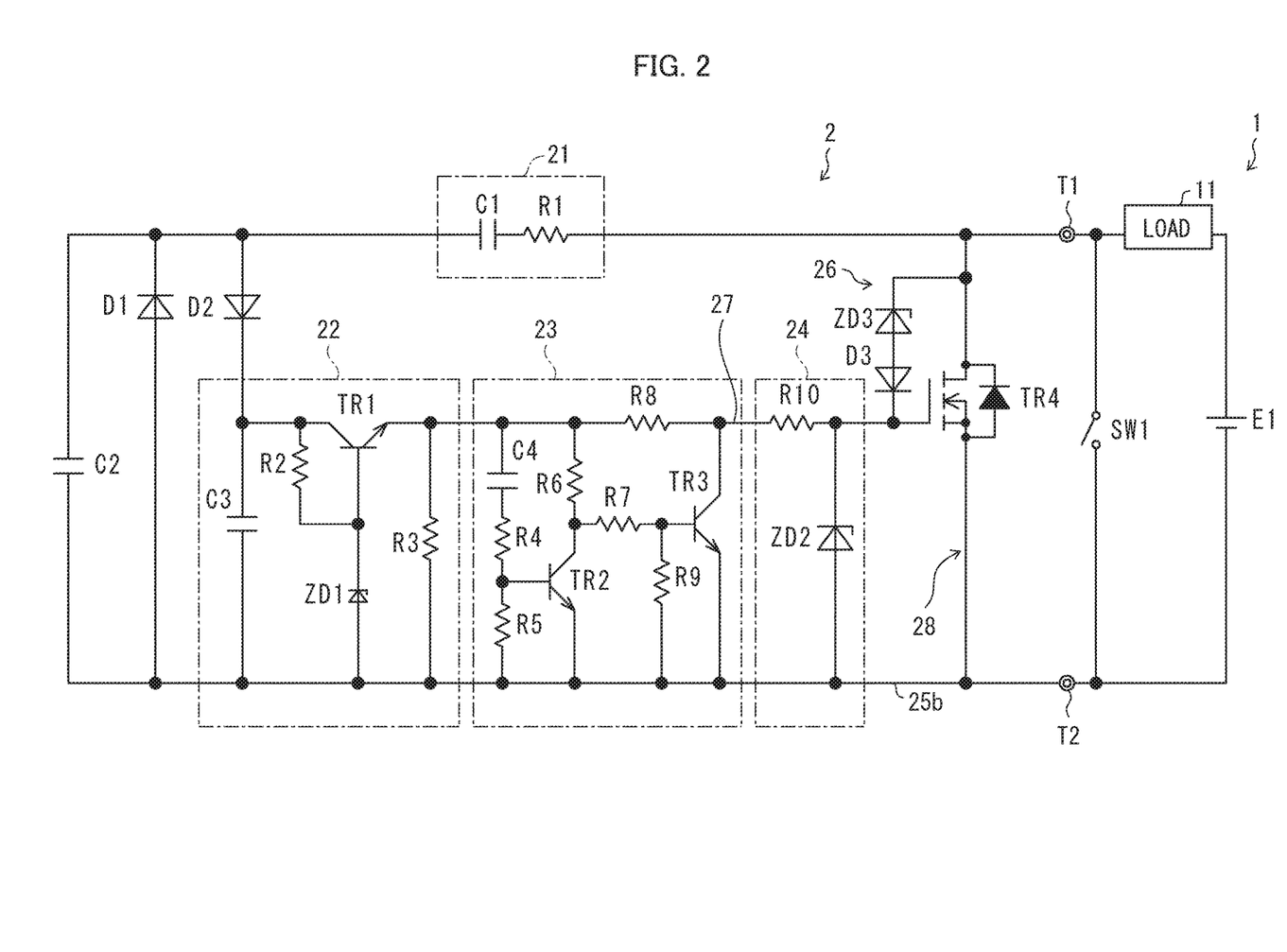
FIG. 2 is a circuit diagram of the load device and the arc quenching device each illustrated in FIG. 1.

FIG. 2 is a circuit diagram of the load device 1 and the arc quenching device 2 each illustrated in FIG. 1. As illustrated in FIG. 2, the first timer circuit 21 of the arc quenching device 2 includes the capacitor C1 and a resistor R1 which are connected in series. Note that the capacitor C1 is much larger in capacitance than a capacitor C3 of the constant voltage circuit 22 and a capacitor C4 of the second timer circuit 23. The resistor R1, which is a resistor having a low resistance, is preferably provided so that an excessively high electric current is prevented from flowing to a circuit. Note, however, that the arc quenching device 2, whose basic operation is to quench an arc, does not necessarily need to include the resistor R1.

The constant voltage circuit 22 includes a transistor TR1, the capacitor C3, and resistors R2 and R3, and a Zener diode ZD1. The transistor TR1 has an emitter which is connected to a third electrically conducted path 27 which leads from the emitter to the gate of the semiconductor switch TR4. The capacitor C3 is provided between a collector of the transistor TR1 and the second electrically conducted path 25b. The resistor R2 is provided between a base of the transistor TR1 and the collector of the transistor TR1. The Zener diode ZD1 is provided between the base of the transistor TR1 and the second electrically conducted path 25b. The resistor R3 is provided between the emitter of the transistor TR1 and the second electrically conducted path 25b. Note that the diode D2 (described earlier) has a cathode which is connected to the collector of the transistor TR1.

The second timer circuit 23 includes transistors TR2 and TR3, resistors R4 through R9, and the capacitor C4. The transistors TR2 and TR3 have respective emitters each of which is connected to the second electrically conducted path 25b. The capacitor C4 and the resistor R4 are provided between the third electrically conducted path 27 and a base of the transistor TR2 while being connected in series. The resistor R5 is provided between the base of the transistor TR2 and the second electrically conducted path 25b. The resistor R6 is provided between the third electrically conducted path 27 and a collector of the transistor TR2. The resistor R7 is provided between the collector of the transistor TR2 and a base of the transistor TR3. The resistor R8 is provided, on the third electrically conducted path 27, between (a) a connection between the third electrically conducted path 27 and the resistor R6 and (b) a connection between the third electrically conducted path 27 and a collector of the transistor TR3. The resistor R9 is provided between the base of the transistor TR3 and the second electrically conducted path 25b.

The protection circuit 24 includes a resistor R10 and a Zener diode ZD2. The resistor R10 is provided, on the third electrically conducted path 27, between (a) a connection between the third electrically conducted path 27 and the collector of the transistor TR3 and (b) the gate of the semiconductor switch TR4. The Zener diode ZD2 is provided between the gate of the semiconductor switch TR4 and the second electrically conducted path 25b. The resistor 10, which is a resistor called a gate resistance, limits an electric current which flows into a parasitic capacitance generated between a gate and a source of an FET, which is the semiconductor switch TR4.

Furthermore, between the gate and the drain of the semiconductor switch TR4, a surge circuit 26 including a diode D3 and a Zener diode ZD3 which are connected in series is provided. The surge circuit 26 is configured to protect the semiconductor switch TR4 by turning on the semiconductor switch TR4 in response to application, to the semiconductor switch TR4, of an excessively high voltage which exceeds a withstanding voltage.

(Operation of Arc Quenching Device 2)

The following description will discuss an operation, based on the above-described configuration, of the arc quenching device 2. In a case where the first switch SW1 is opened, a voltage is generated between the contact points of the first switch SW1. The voltage which has been generated between the contact points causes the constant voltage circuit 22 to operate. Then, an output voltage of the constant voltage circuit 22 is applied to the gate of the semiconductor switch TR4, so that the semiconductor switch TR4 turns on. This causes the bypass circuit 28 to be in a closed state and consequently restrains an arc from occurring between the contact points of the first switch SW1.

Specifically, in a case where the first switch SW1 is opened, a voltage is generated between the contact points of the first switch SW1 only for a moment. In a case where a voltage is generated between the contact points of the first switch SW1, an electric current flows from the positive side connection terminal T1, through the first electrically conducted path 25a, toward the first timer circuit 21. After passing through the first timer circuit 21, the electric current flows into the capacitor C3 of the constant voltage circuit 22 via the diode D2. This causes a base electric current to flow to the transistor TR1 of the constant voltage circuit 22, so that the transistor TR1 turns on. Furthermore, the base electric current flows to the transistor TR2 of the second timer circuit 23 via the capacitor C4 and the resistor R4, so that the transistor TR2 turns on. Note that a fixed voltage is applied to the base of the transistor TR1 by an operation of the Zener diode ZD1.

The transistor TR3 of the second timer circuit 23 maintains an off state while the transistor TR2 is in an on state. This causes a voltage which has been supplied from the constant voltage circuit 22 to be applied to the gate of the semiconductor switch TR4, so that the semiconductor switch TR4 turns on. In a case where the semiconductor switch TR4 has turned on, a state of the bypass circuit 28 changes from an open state to the closed state. Thus, all electric currents flow to the bypass circuit 28 while no electric current flows between the contact points of the first switch SW1. This restrains an arc from occurring in the first switch SW1.

Note that according to the arc quenching device 2, a voltage (e.g., 10 V) which is generated between the contact points of the first switch SW1 in a case where the first switch SW1 is opened is set so as to be lower than a voltage (e.g., 12 V) which is generated between the contact points of the SW1 in a case where an arc occurs in the first switch SW1. This allows the arc quenching device 2 to prevent an arc from occurring in a case where the first switch SW1 is opened. This point also applies to other embodiments.

In a case where a predetermined time has elapsed since the semiconductor switch TR4 turned on, the second timer circuit 23 interrupts supply of a voltage from the constant voltage circuit 22 to the semiconductor switch TR4 so that the semiconductor switch TR4 turns off. This causes the bypass circuit 28 to be in the open state.

Specifically, after the semiconductor switch TR4 has turned on, no electric current flows into the first electrically conducted path 25a, but the constant voltage circuit 22 and the second timer circuit 23 continue their respective operations with use of electric charges which have been accumulated in the capacitors C1 and C3.

In a case where a predetermined time which is determined in accordance with respective values of the capacitor C4 and the resistor R4 has elapsed since the semiconductor switch TR4 turned on, charging of the capacitor C4 of the second timer circuit 23 has been finished. This prevents the base electric current from flowing to the transistor TR2, so that the transistor TR2 turns off.

In a case where the transistor TR2 has turned off, the base electric current flows to the transistor TR3 via the resistors R6 and R7, so that the transistor TR3 turns on. The transistor TR3 causes the third electrically conducted path 27 to be connected to the first electrically conducted path 25a. This causes the semiconductor switch TR4 to have a gate voltage of 0 V, so that the semiconductor switch TR4 turns off. This causes the bypass circuit 28 to be in the open state.

In a case where the semiconductor switch TR4 has turned off, since the first switch SW1 is in the open state, a voltage between the contact points of the first switch SW1 is reset to a voltage of the direct current power supply E1. Thereafter, in a case where charging of the capacitor C1 of the first timer circuit 21 has been finished, the first electrically conducted path 25a is interrupted by the first timer circuit 21. This causes the arc quenching device 2 to be in a stable state while being electrically separated from the load device 1, i.e., the direct current power supply E1.

As described above, according to the arc quenching device 2, the second timer circuit 23 forces the semiconductor switch TR4 to turn off within a period during which the constant voltage circuit 22 in normal operation.

Furthermore, the first timer circuit 21 has a function of stopping an operation of the constant voltage circuit 22 as described earlier by electrically separating the arc quenching device 2 from the load device 1 after the semiconductor switch TR4 has turned off. The function allows the first timer circuit 21 to prevent electric power of the direct current power supply E1 of the load device 1 from being continuously consumed by the arc quenching device 2. This allows the arc quenching device 2 to include, instead of the first timer circuit 21 which includes the resistor R1 and the capacitor C1, a circuit which causes the arc quenching device 2 (in particular, the constant voltage circuit 22) to be electrically separated from the load device 1 after the semiconductor switch TR4 has turned off. This point also applies to other embodiments.

(Advantage of Arc Quenching Device 2)

According to the arc quenching device 2, in a case where a predetermined time has elapsed since the semiconductor switch TR4 turned on in response to opening of the first switch SW1, the second timer circuit 23 interrupts supply of a voltage from the constant voltage circuit 22 to the semiconductor switch TR4 so that the semiconductor switch TR4 turns off. This causes the bypass circuit 28 which has been formed by the semiconductor switch TR4 to be in the open state.

In this case, the second timer circuit 23 can (i) set, regardless of (a) a voltage applied to the first switch SW1 and (b) a speed at which to open/close the first switch SW1, any time for which the semiconductor switch TR4 is electrically conducted and (ii) turn on the semiconductor switch for a minimum time required for quenching of an arc electric current between the contact points of the first switch SW1.

That is, the semiconductor switch TR4 can switch its state from an on state to an off state by an operation of the second timer circuit 23 without having a transition period for a change from the on state to the off state.

With the configuration, the semiconductor switch TR4 loses less electric power and generates a smaller amount of heat. This causes no fear that a trouble may occur in the semiconductor switch TR4 due to a greater electric power loss. Thus, the semiconductor switch TR4 does not need to (i) be an expensive and large-sized element and (ii) be provided with a heat radiation device. This makes it possible to configure the arc quenching device 2 which is highly reliable, small-sized, and inexpensive.

Note that the arc quenching device 2 is also effective in prevention of occurrence of an arc in the first switch SW1 in a case where the first switch SW1 is, for example, a trigger switch and a state of the first switch SW1 is changed from the closed state to the open state by a bounce.

Furthermore, the arc quenching device 2 (i) includes the constant voltage circuit 22 which serves as the power supply circuit and (ii) causes the constant voltage circuit 22 to output a stable and fixed direct current voltage. Thus, even in a case where a voltage of the direct current power supply E1, a load electric current, and/or the like change(s), the second timer circuit 23 can accurately turn off the semiconductor switch TR4 after a predetermined time has elapsed since the semiconductor switch TR4 turned on. This makes it possible to control the semiconductor switch TR4 so that an amount in which the semiconductor switch TR4 loses heat is restricted to a certain amount, and consequently to protect the semiconductor switch TR4 without fail.

Note that the arc quenching device 2 can include, instead of the constant voltage circuit 22, a power supply circuit configured to drive merely the semiconductor switch TR4. Such a power supply circuit is obtained by omitting, for example, the transistor TR1, the resistor R2, and the Zener diode ZD1 from the constant voltage circuit 22.

The description of Embodiment 1 has taken, as an example, a case where the semiconductor switch TR4 serving as a switching element is an FET. Note, however, that examples of the semiconductor switch TR4 include not only an FET but also an insulated gate bipolar transistor (IGBT) and other power transistors. This point also applies to other embodiments to be described below.

Embodiment 2

Another embodiment of the present invention is described below with reference to the drawings. Note that, for convenience, members having functions identical to those of the respective members described in Embodiment 1 are given respective identical reference signs, and a description of those members is omitted here.

Figure 3:
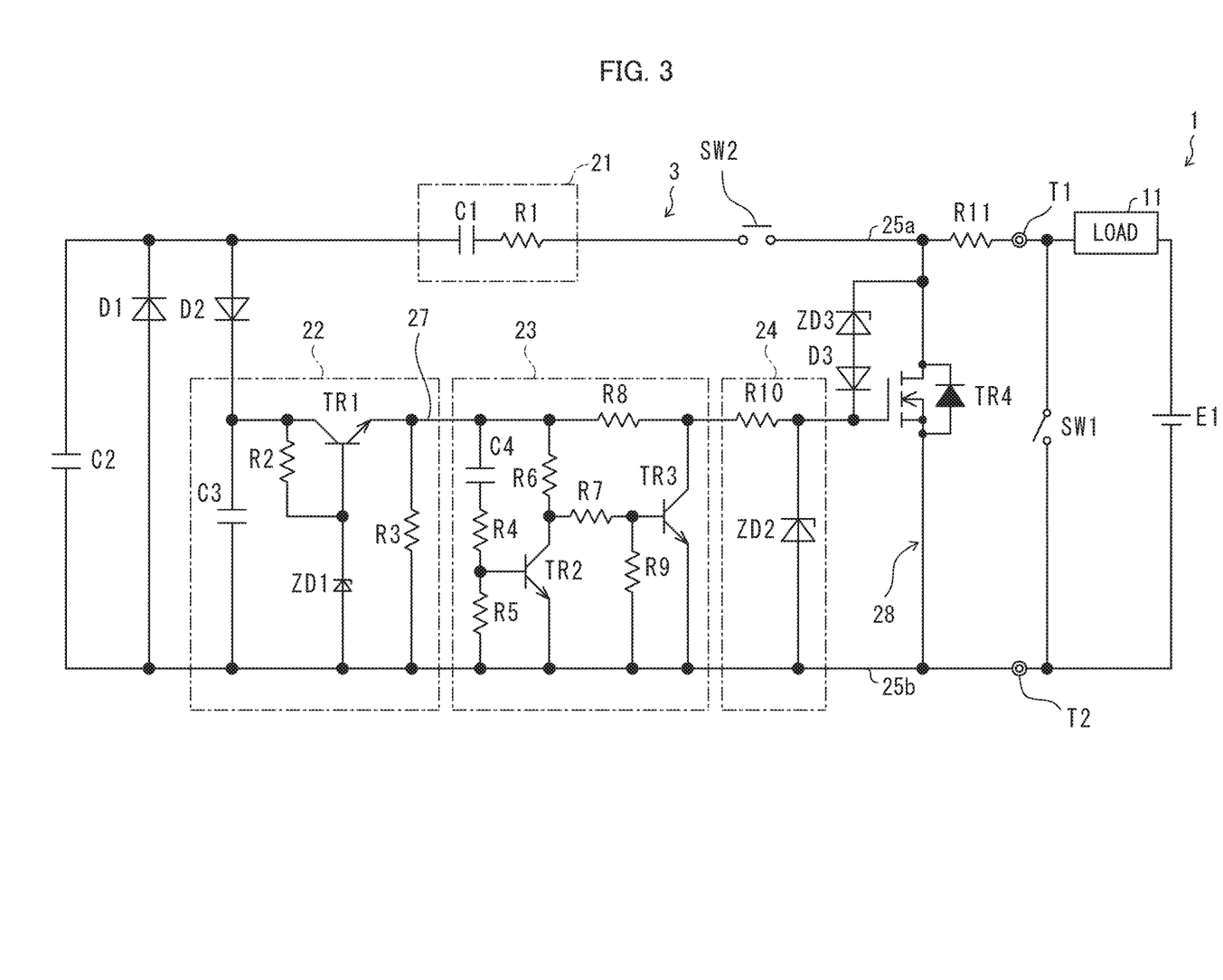
FIG. 3 is a circuit diagram illustrating a state in which an arc quenching device of another embodiment of the present invention is connected to a load device.
Figure 4:
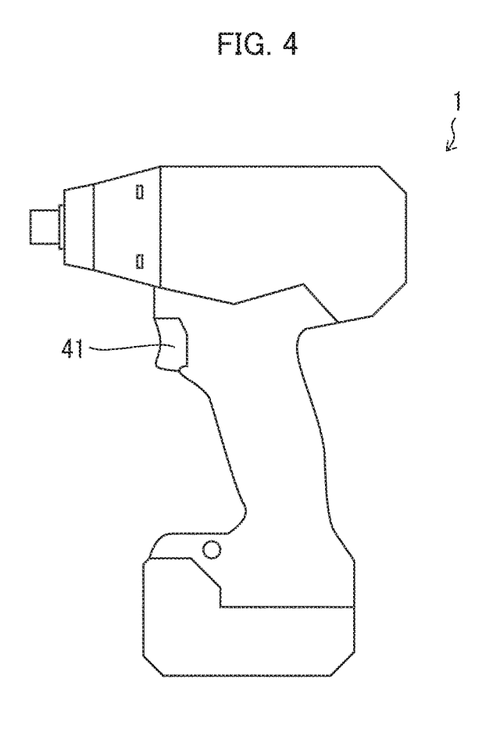
FIG. 4 is a front view showing an example of an electric power tool, which is a load device including the arc quenching device of the another embodiment of the present invention.

FIG. 3 is a circuit diagram illustrating a state in which an arc quenching device of Embodiment 2 is connected to a load device. FIG. 4 is a front view showing an example of an electric power tool, which is a load device including the arc quenching device of Embodiment 2.

An arc quenching device 3 of Embodiment 2 is obtained by causing the arc quenching device 2 to further include a protective resistor R11 and a second switch SW2. The arc quenching device 3 and the arc quenching device 2 (described earlier) are identical in configuration except that the arc quenching device 3 includes the protective resistor R11 and the second switch SW2. Note that the arc quenching device 3 can be configured to include only one of the protective resistor R11 and the second switch SW2.

(Configuration of Protective Resistor R11)

The protective resistor R11 is connected in series to a semiconductor switch TR4 in a bypass circuit 28. Note that the protective resistor R11 does not necessarily need to be provided between the semiconductor switch TR4 and a positive side connection terminal T1 as illustrated in FIG. 3. The protective resistor R11 can alternatively be provided between the semiconductor switch TR4 and a negative side connection terminal T2. For example, the protective resistor R11 can be provided between the semiconductor switch TR4 and a connection, located between a load 11 and a first timer circuit 21 (on a first electrically conducted path 25a), between the first electrically conducted path 25a and the semiconductor switch TR4.

The protective resistor R11 is a chip resistor whose resistance has a value as small as, for example, approximately 1 mΩ to 10 mΩ. The protective resistor R11 is preferably a chip resistor whose electrically conductive part is made of a metallic thin film. In this case, the chip resistor is configured such that the metallic thin film is provided on, for example, a ceramic substrate. In a case where a short circuit occurs in the semiconductor switch TR4 due to a trouble having occurred in the semiconductor switch TR4, the protective resistor R11 is, for example, fused and disconnected. This prevents an electric current from continuously flowing to the bypass circuit 28.

Specifically, the protective resistor R11 is configured to be disconnected in a case where an electric current flows to the bypass circuit 28 for a time (e.g., a time not shorter than 10 msec) longer than a time which is set by the second timer circuit 23 and for which the semiconductor switch TR4 is on. The protective resistor R11 can be a chip resistor which is commercially available, is made of metallic foil, and has a low resistance.

(Advantage Brought by Arc Quenching Device 3 Including Protective Resistor R11)

The arc quenching device 3 which includes the protective resistor R11 has such an advantage as described below.

Conventionally, a fuse is commonly used to protect a circuit in a case where a short circuit occurs in the semiconductor switch TR4 which is provided in the bypass circuit 28. For example, according to a configuration described in Patent Literature 2, provided are (i) a mechanical switch which is connected between a direct current power supply and a load, (ii) a semiconductor switch which is connected in parallel to the mechanical switch, (iii) a control circuit which turns on and off the semiconductor switch, and (iv) a fuse which is connected in series to each of the semiconductor switch and the mechanical switch. The fuse has a function of separating a semiconductor switch from a circuit in a case where a short circuit fault occurs in the semiconductor switch due to an excess electric current.

Note, however, that a fuse which has a larger rated electric current commonly has a part shape in accordance with that rated electric current. For example, a fuse which allows a large electric current to flow therethrough even for a moment has a considerably large part shape. A fuse which needs to cause an electric current of 150 A to flow therethrough for, for example, only 1 msec needs to be at least a fuse whose rated electric current is not less than 17 A. In this case, the fuse has considerably large dimensions (length×width×thickness) of, for example, 6.1×2.5×2.5 and is expensive. Thus, use of a fuse causes a substrate of an arc quenching device including the fuse to have a larger size. This hinders the arc quenching device from being made smaller in size and less expensive.

In contrast, the chip resistor which is used as the protective resistor R11 is small-sized and inexpensive. Examples of the chip resistor which causes an electric current of 150 A to flow therethrough for, for example, only 1 msec include a chip resistor having dimensions (length×width×thickness) of 1.25×2.0×0.5. Such a chip resistor has a volume ratio which is approximately 1/30 of that of a fuse which is equivalent in prearcing time-current characteristic to the chip resistor. Thus, in a case where the protective resistor R11 which is a chip resistor is used instead of a fuse, it is possible to make a substrate smaller in size, i.e., to make the arc quenching device 3 smaller in size and less expensive.

(Configuration of Second Switch SW2)

As illustrated in FIG. 3, the second switch SW2 is provided, for example, on the first electrically conducted path 25a, between (a) a connection between the semiconductor switch TR4 and the first electrically conducted path 25a and (b) the first timer circuit 21 so as to open and close the first electrically conducted path 25a. The second switch SW2 is a normally open switch and is exemplified by a switch having a contact point which is manually operated and automatically restored.

According to Embodiment 2, a first switch SW1 and the second switch SW2 are incorporated in a trigger switch 41 of a portable electric power tool, which is a load device 1 illustrated in FIG. 4. In this case, in response to pushing (or pulling) of the trigger switch 41, the second switch SW2 is closed first and then the first switch SW1 is closed. Contrary to the above case, during a reset of the trigger switch 41, the first switch SW1 is opened first and then the second switch SW2 is opened.

(Operation of Arc Quenching Device 3)

Figure 5:
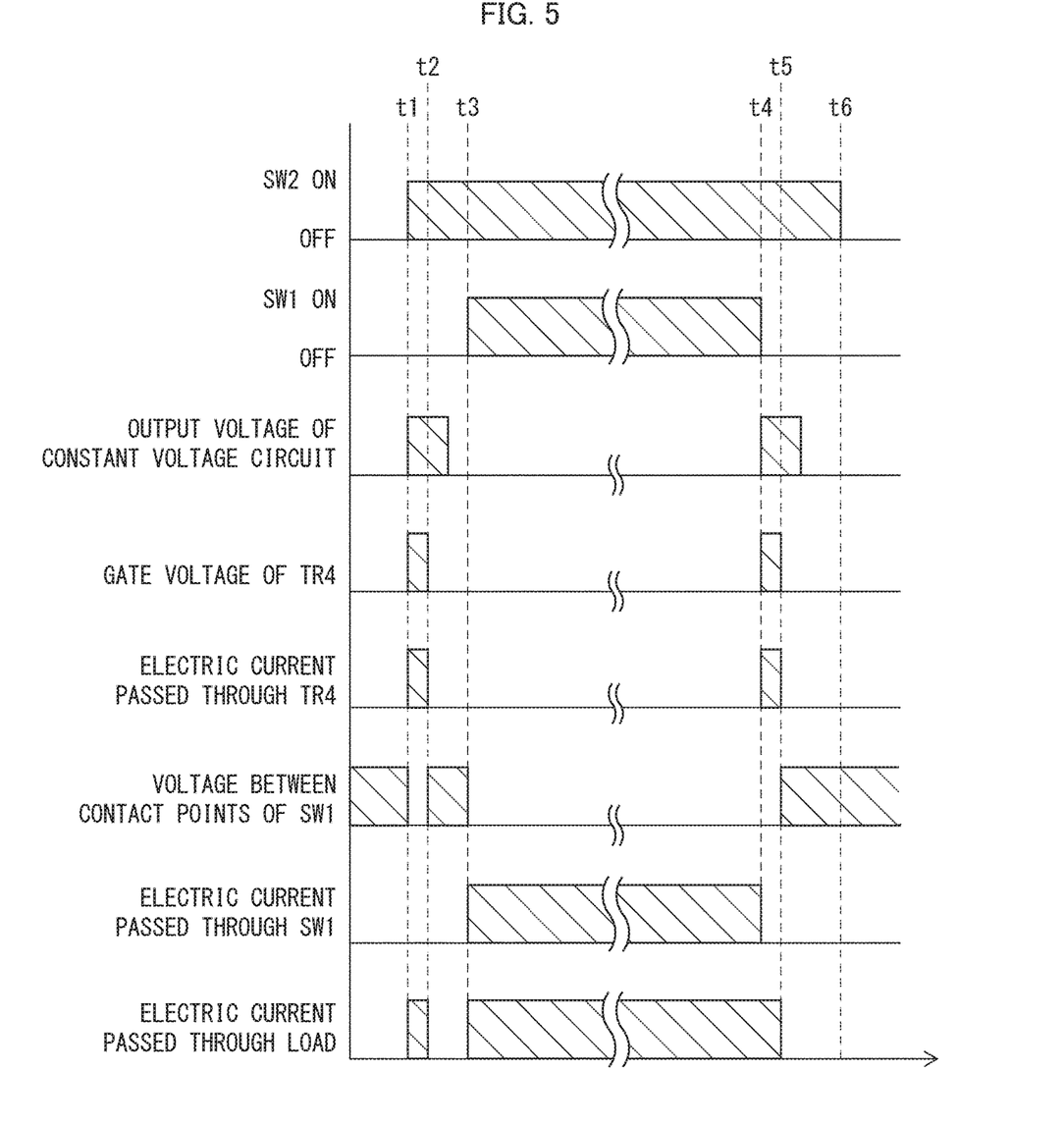
FIG. 5 is a timing chart showing respective operations of sections of the arc quenching device illustrated in FIG. 3.

The operation carried out by the arc quenching device 3 which includes the protective resistor R11 has been described above. The following description will discuss operations carried out by the arc quenching device 3 but different from the above-described operation. FIG. 5 is a timing chart showing respective operations of sections of the arc quenching device 3.

(Case where Second Switch SW2 and First Switch SW1 are Sequentially Closed)

In a case where the load device 1 and the arc quenching device 3 are in a stopped state, the first switch SW1 and the second switch SW2 open. This causes a voltage deriving from a direct current power supply E1 to be generated between contact points of the first switch SW1.

The following description will discuss an operation which is carried out in a case where a user gradually pushes the trigger switch 41 from the above-described state in which the first switch SW1 and the second switch SW2 open in the stopped state of the load device 1 and the arc quenching device 3. In a case where a user of the load device 1 gradually pushes the trigger switch 41, the second switch SW2 is closed first at t1, so that an electric current flows from the direct current power supply E1 of the load device 1 through the first electrically conducted path 25a to a constant voltage circuit 22. This causes the constant voltage circuit 22 to start its operation. Note that the first switch SW1 remains open in this state.

In a case where the constant voltage circuit 22 starts its operation, an output voltage of the constant voltage circuit 22 is applied to a gate of the semiconductor switch TR4 via the second timer circuit 23 and a protection circuit 24, so that the semiconductor switch TR4 turns on. This causes the bypass circuit 28 to be in a closed state.

Specifically, after passing through the first timer circuit 21, the electric current which flows through the first electrically conducted path 25a flows into a capacitor C3 of the constant voltage circuit 22 via a diode D2. This causes a base electric current to flow to a transistor TR1 of the constant voltage circuit 22, so that the transistor TR1 turns on. Furthermore, the base electric current flows to a transistor TR2 of the second timer circuit 23 via a capacitor C4 and a resistor R4, so that the transistor TR2 turns on. Note that a fixed voltage is applied to a base of the transistor TR1 by an operation of a Zener diode ZD1.

A transistor TR3 of the second timer circuit 23 maintains an off state while the transistor TR2 is in an on state. This causes a voltage which has been supplied from the constant voltage circuit 22 to be applied to the gate of the semiconductor switch TR4, so that the semiconductor switch TR4 turns on. In a case where the semiconductor switch TR4 has turned on, a state of the bypass circuit 28 changes from an open state to the closed state.

In a case where the bypass circuit 28 is in the closed state, a low impedance is obtained between the contact points of the first switch SW1. Furthermore, an electric current flows to the load 11 of the load device 1 along a route followed by the direct current power supply E1, the load 11, the semiconductor switch TR4, and the direct current power supply E1. Thereafter, in a case where the second timer circuit 23 operates, a voltage of the gate of the semiconductor switch TR4 is lowered, so that the semiconductor switch TR4 turns off at t2. This causes the bypass circuit 28 to be in the open state. Note that the constant voltage circuit 22 stops its operation at and after t2.

Specifically, after the semiconductor switch TR4 has turned on, no electric current flows from the direct current power supply E1 toward the first electrically conducted path 25a whose impedance is higher than that of the semiconductor switch TR4. Note, however, that the constant voltage circuit 22 and the second timer circuit 23 continue their respective operations with use of electric charges which have been accumulated in a capacitor C1 and the capacitor C3.

In a case where a predetermined time which is determined in accordance with respective values of the capacitor C4 and the resistor R4 has elapsed since the semiconductor switch TR4 turned on, charging of the capacitor C4 of the second timer circuit 23 has been finished. This prevents the base electric current from flowing to the transistor TR2, so that the transistor TR2 turns off.

In a case where the transistor TR2 has turned off, the base electric current flows to the transistor TR3 via resistors R6 and R7, so that the transistor TR3 turns on. The transistor TR3 causes a third electrically conducted path 27 to be connected to the first electrically conducted path 25a. This causes the semiconductor switch TR4 to have a gate voltage of 0 V, so that the semiconductor switch TR4 turns off. This causes the bypass circuit 28 to be in the open state.

In a case where the semiconductor switch TR4 has turned off, since the first switch SW1 is in the open state, a voltage between the contact points of the first switch SW1 is reset to a voltage of the direct current power supply E1.

As described earlier, in a case where the semiconductor switch TR4 has turned on and then an electric current flows to the load 11 while the semiconductor switch TR4 is on, the load device 1 displays a behavior which is unintended by the user, e.g., temporarily vibrates. Note, however, that this behavior is displayed during a process in which the user operates the load device 1 while having an intention to move the load device 1. Thus, the behavior is unsurprising to the user and thus does not matter.

During a period from when the semiconductor switch TR4 turns on to when the semiconductor switch TR4 turns off, since the constant voltage circuit 22 is in operation, the semiconductor switch TR4 receives a stable voltage from the constant voltage circuit 22. Thus, the semiconductor switch TR4 accurately turns off after a predetermined time has elapsed since the semiconductor switch TR4 turned on.

Thereafter, in a case where the user further gradually pushes the trigger switch 41, the first switch SW1 is opened at t3. This causes an electric current to flow to the load 11 along a route followed by the direct current power supply E1, the load 11, the first switch SW1, and the direct current power supply E1, so that the load 11 (load device 1) operates.

(Case where First Switch SW1 and Second Switch SW2 are Sequentially Opened)

The following description will discuss an operation which is carried out so that the trigger switch 41 is gradually reset from a state in which the second switch SW2 and the first switch SW1 are closed after the user has pushed the trigger switch 41 to the utmost limit.

In a case where the user gradually resets the trigger switch 41, the first switch SW1 is opened first at t4. In this state, the second switch SW2 remains closed.

In a case where the first switch SW1 is opened, a voltage is generated between the contact points of the first switch SW1. The voltage which has been generated between the contact points causes the constant voltage circuit 22 to operate. An output voltage of the constant voltage circuit 22 is applied to the gate of the semiconductor switch TR4, so that the semiconductor switch TR4 turns on. This causes the bypass circuit 28 to be in the closed state and consequently restrains an arc from occurring between the contact points of the first switch SW1.

Specifically, in a case where the first switch SW1 is opened, a voltage is generated between the contact points of the first switch SW1 only for a moment. In a case where a voltage is generated between the contact points of the first switch SW1, an electric current flows from the positive side connection terminal T1, through the first electrically conducted path 25a, toward the first timer circuit 21. After passing through the first timer circuit 21, the electric current flows into the capacitor C3 of the constant voltage circuit 22 via the diode D2. This causes a base electric current to flow to the transistor TR1 of the constant voltage circuit 22, so that the transistor TR1 turns on. Furthermore, the base electric current flows to the transistor TR2 of the second timer circuit 23 via the capacitor C4 and the resistor R4, so that the transistor TR2 turns on. Note that a fixed voltage is applied to the base of the transistor TR1 by an operation of the Zener diode ZD1.

The transistor TR3 of the second timer circuit 23 maintains the off state while the transistor TR2 is in the on state. This causes a voltage which has been supplied from the constant voltage circuit 22 to be applied to the gate of the semiconductor switch TR4, so that the semiconductor switch TR4 turns on. In a case where the semiconductor switch TR4 has turned on, the state of the bypass circuit 28 changes from the open state to the closed state. Thus, all electric currents flow to the bypass circuit 28 while no electric current flows between the contact points of the first switch SW1. This restrains an arc from occurring in the first switch SW1.

Furthermore, in a case where the bypass circuit 28 is in the closed state, a low impedance is obtained between the contact points of the first switch SW1. An electric current continues to flow also to the load 11 of the load device 1.

Thereafter, in a case where the second timer circuit 23 operates, a voltage of the gate of the semiconductor switch TR4 is lowered, so that the semiconductor switch TR4 turns off at t5. This causes the bypass circuit 28 to be in the open state. In this case, an electric current which flows through the load 11 is interrupted. This causes a voltage to be regenerated between the contact points of the first switch SW1.

Specifically, after the semiconductor switch TR4 has turned on, no electric current that is generated due to an arc flows into the first electrically conducted path 25a, but the constant voltage circuit 22 and the second timer circuit 23 continue their respective operations with use of electric charges which have been accumulated in the capacitors C1 and C3. Note that the constant voltage circuit 22 stops its operation at and after t5.

In a case where a predetermined time which is determined in accordance with respective values of the capacitor C4 and the resistor R4 has elapsed since the semiconductor switch TR4 turned on, charging of the capacitor C4 of the second timer circuit 23 has been finished. This prevents the base electric current from flowing to the transistor TR2, so that the transistor TR2 turns off.

In a case where the transistor TR2 has turned off, the base electric current flows to the transistor TR3 via the resistors R6 and R7, so that the transistor TR3 turns on. The transistor TR3 causes the third electrically conducted path 27 to be connected to the first electrically conducted path 25a. This causes the semiconductor switch TR4 to have a gate voltage which is not more than a threshold, so that the semiconductor switch TR4 turns off. This causes the bypass circuit 28 to be in the open state.

In a case where the semiconductor switch TR4 has turned off, since the first switch SW1 is in the open state, a voltage between the contact points of the first switch SW1 is reset to a voltage of the direct current power supply E1.

As described above, according to the arc quenching device 2, the second timer circuit 23 forces the semiconductor switch TR4 to turn off within a period during which the constant voltage circuit 22 in normal operation.

Note that a time (period from t4 to t5) for which the semiconductor switch TR4 is on is, for example, 1 msec. Also in this case, during a period from when the semiconductor switch TR4 turns on to when the semiconductor switch TR4 turns off, since the constant voltage circuit 22 is in operation, the semiconductor switch TR4 receives a stable voltage from the constant voltage circuit 22. Thus, the semiconductor switch TR4 accurately turns off after a predetermined time has elapsed since the semiconductor switch TR4 turned on.

Thereafter, in a case where charging of the capacitor C1 of the first timer circuit 21 has been finished, the first electrically conducted path 25a is interrupted by the first timer circuit 21. This causes the arc quenching device 2 to be in a stable state while being electrically separated from the load device 1, i.e., the direct current power supply E1.

In a case where the trigger switch 41 is further gradually reset, the second switch SW2 is opened at t6.

Note here that in a state in which the user does not operate the trigger switch 41 of the electric power tool, which is the load device 1, the second switch SW2 is in the open state and the first electrically conducted path 25a is interrupted. Thus, also in a case where the user detaches the direct current power supply E1 (e.g., a storage battery) from the electric power tool and then attaches the direct current power supply E1 to the electric power tool, the load device 1 generates no pulse electric current, the semiconductor switch TR4 does not turn on, and no pulse electric current flows to the load 11. This prevents the electric power tool from displaying a behavior which is unexpected by the user.

(Advantage Brought by Arc Quenching Device 3 Including Second Switch SW2)

As described above, in the state in which the user does not operate the trigger switch 41 of the electric power tool, which is the load device 1, the first electrically conducted path 25a is interrupted by the second switch SW2. Thus, also in a case where the user detaches the direct current power supply E1 from the electric power tool and then attaches the direct current power supply E1 to the electric power tool, no pulse electric current flows to the load 11. This (i) prevents the electric power tool from displaying a behavior which is unexpected by the user and (ii) allows the arc quenching device 3 to prevent the load device 1 from displaying an unnecessary behavior during starting of a power supply (the direct current power supply E1).

(Other Locations of Second Switch SW2)

Note that the second switch SW2 does not necessarily need to be provided at a location illustrated in FIG. 3 but can be provided at any of the following locations (1) through (7):

(1) between (a) a connection, located on the first electrically conducted path 25a (bypass circuit 28), between the semiconductor switch TR4 and the first electrically conducted path 25a and (b) the positive side connection terminal T1;

(2) between (a) a connection, located on the second electrically conducted path 25b (bypass circuit 28), between the semiconductor switch TR4 and the second electrically conducted path 25b and (b) the negative side connection terminal T2;

(3) between (a) a connection, located on the bypass circuit 28, between the semiconductor switch TR4 and the first electrically conducted path 25a and (b) the semiconductor switch TR4;

(4) between (a) a connection, located on the bypass circuit 28, between the semiconductor switch TR4 and the second electrically conducted path 25b and (b) the semiconductor switch TR4;

(5) between (a) a connection, located on the first electrically conducted path 25a, between the diode D2 and the first electrically conducted path 25a and (b) the first timer circuit 21;

(6) between (a) a connection between the capacitor C3 and the second electrically conducted path 25b and (b) the capacitor C3; and (7) between (a) a connection, located on the second electrically conducted path 25b, between the capacitor C3 and the second electrically conducted path 25b and (b) a connection between the resistor R3 and the second electrically conducted path 25b According to the second switch SW2 which is provided at any of the above locations (1) through (7), in a case where the second switch SW2 is opened, the bypass circuit 28 is interrupted and the semiconductor switch TR4 is prevented from turning on, or the constant voltage circuit 22 is prevented from operating and the semiconductor switch TR4 is prevented from operating.

The second switch SW2 which is provided at the location (1) or the location (2) has the following advantage. Specifically, a withstanding voltage test on the second switch SW2 is carried out by applying a voltage of, for example, 1000 V to 2000 V to the second switch SW2. In this case, since an FET, which is the semiconductor switch TR4, has a low withstanding voltage, the semiconductor switch TR4 needs to be completely separated from the first switch SW1.

In this case, the second switch SW2 which is provided at the location (1) or the location (2) allows the semiconductor switch TR4 to be separated from the first switch SW1. With the configuration, even in a case where the semiconductor switch TR4 has a low withstanding voltage, the withstanding voltage test can be carried out by, for example, applying the above voltage to each of both ends of the first switch SW1 (with use of, for example, a test probe). Thus, the second switch SW2 which is provided at the location (1) or the location (2) makes it possible to easily carry out the withstanding voltage test on the first switch SW1 without the need to separately provide a switch for separating the semiconductor switch TR4 from the first switch SW1.

Furthermore, the second switch SW2 which is in the open state allows the semiconductor switch TR4 to be separated from the load device 1 so as to be insulated. Thus, for example, in a case where a short circuit fault occurs in the semiconductor switch TR4, the second switch SW2 which is in the open state makes it possible to (i) interrupt a path through which an electric current flows to the semiconductor switch TR4 and (ii) protect a circuit of the arc quenching device 3. This allows the arc quenching device 3 to be safer.

The second switch SW2 which is provided at the location (3) or the location (4) allows the semiconductor switch TR4 to be separated from the bypass circuit 28, i.e., the load device 1 so as to be insulated. Thus, for example, in a case where a short circuit fault occurs in the semiconductor switch TR4, as in the case of the second switch SW2 which is provided at the location (1) or the location (2), the second switch SW2 which is provided at the location (3) or the location (4) makes it possible to protect a circuit of the arc quenching device 3 and consequently to make the arc quenching device 3 safer.

Embodiment 3

A further embodiment of the present invention is described below with reference to the drawings. Note that, for convenience, members having functions identical to those of the respective members described in Embodiments 1 and 2 are given respective identical reference signs, and a description of those members is omitted here.

Figure 6:
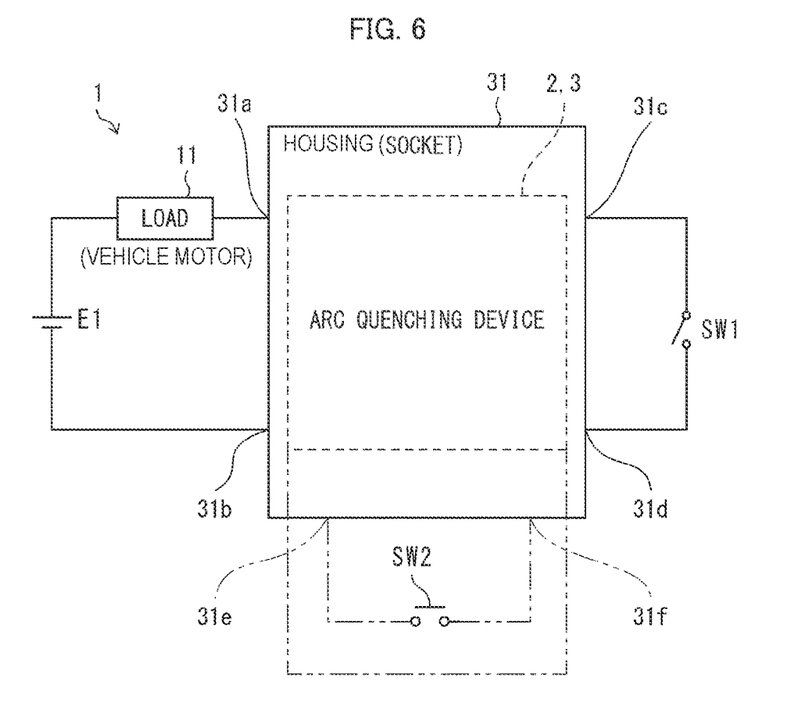
FIG. 6 is a block diagram illustrating a further embodiment of the present invention and showing an example of application of an arc quenching device.

FIG. 6 is a block diagram showing an example of application of an arc quenching device of Embodiment 3. As described earlier, the arc quenching device 2 described in Embodiment 1 is applicable to a device (e.g., an electric power tool) which has the trigger switch 41 in which only the first switch SW1 is incorporated, and the arc quenching device 3 described in Embodiment 2 is applicable to a device (e.g., an electric power tool) which has the trigger switch 41 in which the first switch SW1 and the second switch SW2 are incorporated. Other examples of application of the arc quenching device of Embodiment 3 include an arc quenching device 2 or 3 which is incorporated in a socket 31 which is connected to a load 11 (see FIG. 6). In this case, the arc quenching device 2 or 3 is configured in a form of a unit which has a housing.

According to the configuration illustrated in FIG. 6, the load 11 is, for example, an in-vehicle motor, and a first switch SW1 is, for example, a relay which is connected to the socket 31. In this case, the socket 31 can include (i) connection terminals 31a and 31b which are connected with the load 11 and a direct current power supply E1, respectively, and (ii) connection terminals 31c and 31d each of which is connected with the relay (first switch SW1). In a case where the arc quenching device 3 is incorporated in the socket 31, a second switch SW2 (e.g., a relay) can be provided, as in the case of the first switch SW1, so as to be external to the socket 31. In this case, the socket 31 further includes connection terminals 31e and 31f each of which is connected to the second switch SW2.

With the configuration, the arc quenching device 2 or 3 makes a life of a relay longer by (i) preventing an arc from occurring between contact points of the relay or (ii) quenching an arc which has occurred between the contact points of the relay.

The arc quenching device 2 or 3 is applicable to another industrial device that has a switch.

[Recap]

An arc quenching device in accordance with an aspect of the present invention includes: a semiconductor switch connected in parallel to a first switch which is mechanical and is connected in series to a direct current power supply of a load device; a power supply circuit connected to each of both contact points of the first switch and configured to use a voltage which is generated between the both contact points in response to opening of the first switch to output a voltage which causes the semiconductor switch to turn on; and a timer circuit provided between the power supply circuit and the semiconductor switch and configured to (i) operate in response to an output voltage of the power supply circuit and (ii) after a predetermined time has elapsed since the semiconductor switch turned on, interrupt supply of a voltage from the power supply circuit to the semiconductor switch so as to cause the semiconductor switch to turn off.

With the configuration, a voltage is generated between the both contact points of the first switch in response to opening of the first switch, and the power supply circuit uses the voltage to output a voltage which causes the semiconductor switch to turn on, so that the semiconductor switch turns on. In a case where the semiconductor switch has turned on, an electric current bypasses the first switch and flows to the semiconductor switch. Thus, between the contact points of the first switch, an arc is quenched, or no arc occurs.

After a predetermined time has elapsed since the semiconductor switch turned on, the timer circuit interrupts supply of a voltage from the power supply circuit to the semiconductor switch so as to cause the semiconductor switch to turn off. In this case, the second timer circuit can (i) set any time for which the semiconductor switch is electrically conducted and (ii) turn on the semiconductor switch for a minimum time required for quenching of an electric current between the contact points of the first switch.

That is, the semiconductor switch can switch its state from an on state to an off state by an operation of the timer circuit without having a transition period for a change from the on state to the off state. With the configuration, the semiconductor switch loses less electric power and generates a smaller amount of heat. This causes no fear that a trouble may occur in the semiconductor switch due to a greater electric power loss. Thus, the semiconductor switch does not need to (i) be an expensive and large-sized element and (ii) be provided with a heat radiation device. This makes it possible to configure an arc quenching device which is highly reliable, small-sized, and inexpensive.

The arc quenching device can be configured such that the power supply circuit is a constant voltage circuit.

With the configuration, a stable fixed voltage is supplied to the timer circuit from the constant voltage circuit, which serves as the power supply circuit. Thus, even in a case where a voltage of the direct current power supply, a load electric current, and/or the like change(s), the timer circuit can accurately turn off the semiconductor switch after a predetermined time has elapsed since the semiconductor switch turned on. This makes it possible to control the semiconductor switch so that an amount in which the semiconductor switch loses heat is restricted to a certain amount, and consequently to protect the semiconductor switch without fail.

The arc quenching device can be configured to further include: an interruption circuit provided, on an electrically conducted path, between one of the contact points of the first switch and the power supply circuit and configured to interrupt the electrically conducted path after the semiconductor switch has turned off.

With the configuration, the interruption circuit (e.g., another timer circuit) is configured to interrupt the electrically conducted path between one of the contact points of the first switch and the power supply circuit after the semiconductor switch has turned off. This causes the arc quenching device to be in a stable state while being electrically separated from the direct current power supply of the load device. This makes it possible to prevent electric power of the direct current power supply from being continuously consumed by the arc quenching device.

The arc quenching device can be configured to further include: a chip resistor provided in series between the first switch and the semiconductor switch and configured to be disconnected by an electric current which flows through the semiconductor switch which is on for a longer time than a time which is set by the timer circuit.

With the configuration, the chip resistor protects a circuit by being disconnected so as to interrupt an electric current which flows through the semiconductor switch which is on, due to, for example, a short circuit fault therein, for a longer time than a time which is set by the timer circuit.

Note here that the chip resistor, which is smaller in size and less expensive than a fuse which is conventionally used, allows the arc quenching device to be smaller in size and less expensive.

The arc quenching device can be configured such that the chip resistor has an electrically conductive part which is made of a metallic thin film.

With the configuration, the chip resistor has an electrically conductive part which is made of a metallic thin film. Thus, in a case where the semiconductor switch is on for a longer time than a time which is set by the timer circuit, the chip resistor is fused and disconnected. This protects a circuit without fail.

The arc quenching device can be configured to further include: a second switch which is normally open and is provided at a location at which to interrupt a connection between the first switch and the semiconductor switch, or at a location at which to stop an operation of the power supply circuit.

With the configuration, a second switch which is normally open is provided at a location at which to interrupt a connection between the first switch and the semiconductor switch, or at a location at which to stop an operation of the power supply circuit. Thus, also in a case where a user detaches the direct current power supply from the load device and then attaches the direct current power supply to the load device, since the second switch which is normally open is provided, no pulse electric current flows to the load device. This (i) prevents the load device from displaying a behavior which is unexpected by the user and (ii) allows the arc quenching device to prevent the load device from displaying an unnecessary behavior during starting of the direct current power supply.

The arc quenching device can be configured such that: the second switch, together with the first switch, is incorporated in a trigger switch of an electric power tool, which is the load device; and during pushing of the trigger switch, the second switch is closed first and then the first switch is closed, whereas during a reset of the trigger switch, the first switch is opened first and then the second switch is opened.

With the configuration, an arc which occurs, during closing and opening of the first switch, due to an operation carried out by the user with respect to a trigger switch can be quenched in an electric power tool which has the trigger switch. Furthermore, the configuration makes it possible to prevent a behavior, which is unexpected by the user, of the electric power tool in a case where the user who is not operating the trigger switch detaches the direct current power supply from the electric power tool and then attaches the direct current power supply to the electric power tool.

The arc quenching device can be configured such that the arc quenching device has a housing (e.g., a socket), the housing being provided with (a) a connection with which to connect the first switch of the load device and (b) a connection with which to connect each of the direct current power supply of the load device and a load of the load device.

The configuration allows the arc quenching device to hold circuit components in a housing so as to be configured in a form of a unit. This makes it easy to apply the arc quenching device to various load devices.

The arc quenching device can be configured such that the load is an in-vehicle motor, and the first switch is a relay configured to turn on and off the in-vehicle motor.

The configuration allows the arc quenching device to make a life of a relay, which frequently operates, longer by preventing wear from occurring in contact points due to an arc, so that the arc quenching device can be configured to be suitable to be provided in a vehicle.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Load device
2-3 Arc quenching device
11 Load
21 First timer circuit (interruption circuit)
22 Constant voltage circuit
23 Second timer circuit (timer circuit)
24 Protection circuit
25a First electrically conducted path
25b Second electrically conducted path
27 Third electrically conducted path
28 Bypass circuit
31 Socket
41 Trigger switch
E1 Direct current power supply
T1 Positive side connection terminal
T2 Negative side connection terminal
SW1 First switch
SW2 Second switch
TR4 Semiconductor switch

The invention claimed is:

1. An arc quenching device configured to quench an arc which occurs in a direct current switch,
said arc quenching device comprising:
a semiconductor switch connected in parallel to a first switch which is mechanical and is connected in series to a direct current power supply of a load device;
a power supply circuit connected to each of both contact points of the first switch and configured to use a voltage which is generated between the both contact points in response to opening of the first switch to output a voltage which causes the semiconductor switch to turn on;
a timer circuit provided between the power supply circuit and the semiconductor switch and configured to (i) operate in response to an output voltage of the power supply circuit and (ii) after a predetermined time has elapsed since the semiconductor switch turned on, interrupt supply of a voltage from the power supply circuit to the semiconductor switch so as to cause the semiconductor switch to turn off; and
a second switch which is normally open and is provided at a location at which to interrupt a connection between the first switch and the semiconductor switch, or at a location at which to stop an operation of the power supply circuit.

2. The arc quenching device as set forth in claim 1, wherein
the second switch, together with the first switch, is incorporated in a trigger switch of an electric power tool, which is the load device; and
during pushing of the trigger switch, the second switch is closed first and then the first switch is closed, whereas during a reset of the trigger switch, the first switch is opened first and then the second switch is opened.

3. The arc quenching device as set forth in claim 1, wherein the arc quenching device has a housing, the housing being provided with (a) a connection with which to connect the first switch of the load device and (b) a connection with which to connect the direct current power supply of the load device and a load of the load device.

4. The arc quenching device as set forth in claim 3, wherein the load is an in-vehicle motor, and the first switch is a relay configured to turn on and off the in-vehicle motor.

5. An arc quenching device configured to quench an arc which occurs in a direct current switch, said arc quenching device comprising:
a semiconductor switch connected in parallel to a first switch which is mechanical and is connected in series to a direct current power supply of a load device;
a power supply circuit connected to each of both contact points of the first switch and configured to use a voltage which is generated between the both contact points in response to opening of the first switch to output a voltage which causes the semiconductor switch to turn on; and
a timer circuit provided between the power supply circuit and the semiconductor switch and configured to (i) operate in response to an output voltage of the power supply circuit and (ii) after a predetermined time has elapsed since the semiconductor switch turned on, interrupt supply of a voltage from the power supply circuit to the semiconductor switch so as to cause the semiconductor switch to turn off; and
an interruption circuit provided, on an electrically conducted path, between one of the contact points of the first switch and the power supply circuit and configured to interrupt the electrically conducted path after the semiconductor switch has turned off.

6. The arc quenching device as set forth in claim 5, wherein the power supply circuit is a constant voltage circuit.

7. An arc quenching device configured to quench an arc which occurs in a direct current switch, said arc quenching device comprising:
a semiconductor switch connected in parallel to a first switch which is mechanical and is connected in series to a direct current power supply of a load device;
a power supply circuit connected to each of both contact points of the first switch and configured to use a voltage which is generated between the both contact points in response to opening of the first switch to output a voltage which causes the semiconductor switch to turn on; and
a timer circuit provided between the power supply circuit and the semiconductor switch and configured to (i) operate in response to an output voltage of the power supply circuit and (ii) after a predetermined time has elapsed since the semiconductor switch turned on, interrupt supply of a voltage from the power supply circuit to the semiconductor switch so as to cause the semiconductor switch to turn off; and
a chip resistor provided in series between the first switch and the semiconductor switch and configured to be disconnected by an electric current which flows through the semiconductor switch which is on for a longer time than a time which is set by the timer circuit.

8. The arc quenching device as set forth in claim 7, wherein the chip resistor has an electrically conductive part which is made of a metallic thin film.

* * * * *